April 13, 1965    R. S. WATERS    3,178,098
FLUID TRANSLATING APPARATUS
Filed Aug. 10, 1962    2 Sheets-Sheet 1

WITNESSES

INVENTOR
Robert S. Waters
BY

April 13, 1965 R. S. WATERS 3,178,098
FLUID TRANSLATING APPARATUS
Filed Aug. 10, 1962
2 Sheets-Sheet 2 ated Apr. 13, 1965

3,178,098
FLUID TRANSLATING APPARATUS
Robert S. Waters, Lexington, Ohio, assignor to Westinghouse Electric Corporation, East Pittsburgh, Pa., a corporation of Pennsylvania
Filed Aug. 10, 1962, Ser. No. 216,234
3 Claims. (Cl. 230—47)

This invention relates to blowers and more particularly to a blower blade structure of the centrifugal type for impelling air or the like with a positive pressure.

One of the main objects of the invention is to provide a blower blade structure that may be manufactured in relatively small quantities at low cost, yet sufficiently efficient areodynamically for employment in household appliances and other highly competitive apparatus.

Another object is to provide a blower blade structure that may be manufactured of sheet metal by simple shearing and bending methods.

Briefly, in accordance with the invention, the blower blade structure is of substantially channel shape, with a pair of opposed side wall portions or flanges connected to a central wall portion, and is rotatable about a central axis normal to the central wall portion.

Each of the side wall portions is provided with an air intake aperture in its median portion, and the apertures are disposed in fluid communication with a pair of diametrically opposed radial passages at least partly defined by the side walls and the central wall. The blower blade may be mounted for rotation in a simple housing structure having a centrally disposed air intake opening and a pair of opposed discharge outlets.

In operation, when the blower blade structure is rotated, air is drawn into the radial passages from the air inlet openings by the centrifugal force acting on the air in the radial passages. The air is thus pressurized and pumped in radially outwardly directions through the radial passages and discharge outlets.

The above and other objects are effected by the invention as will be apparent from the following description and claims taken in connection with the accompanying drawings, forming a part of this application, in which:

Figure 1:
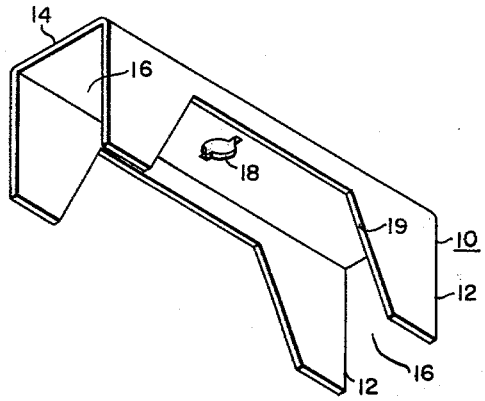
FIGURE 1 is an isometric view of a blower blade structure formed in accordance with the invention.

Referring to the drawings in detail, there is shown a blower blade structure 10 of substantially channel shape having a pair of opposed side wall portions or flanges 12, of preferably planar form and disposed in parallel planes, and a rectangular central wall portion 14 of planar form and having the side wall portions 12 connected thereto to form a unitary structure. The side wall portions 12 and the central wall portion 14 are disposed substantially at right angles to each other to define a pair of opposed passageways 16 of uniform rectangular cross-section extending through the blower blade. The blower blade structure 10 is rotatable about a central axis extending normal to the central wall 14. Accordingly, there is provided a centrally disposed aperture 18 in the central wall portion 14 for rotatably mounting the blower blade. Since the blower blade is rotatable in operation, the passages 16 may be considered to be diametrically opposed and radially extending.

Each of the side wall portions or flanges 12 is provided with an aperture 19 in its median portion, which aperture forms an inlet for air or other fluid to be pumped by the blower. The air inlet opening 19 is defined by an upper edge portion 20, disposed substantially parallel to the central wall portion 14, and a pair of opposed edge portions 21 extending transversely to the edge portion 20. As illustrated, the edge portions 21 are disposed in somewhat converging relation with each other, thereby at least partially defining a pair of blades 22 of generally trapezoidal shape and imparting a trapezoidal shape to the inlet opening 19.

Figure 6:
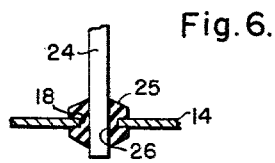
FIG. 6 is a fragmentary sectional view taken on line VI—VI of FIG. 2.

The blower blade structure 10 may be connected for rotation to a suitable motor 23 having an output shaft 24, and, to facilitate such mounting, a resilient hub member 25 (see FIG. 6) having a suitable central bore adapted to snugly fit the motor output shaft 24 may be attached to the central wall portion 14 on the transverse axis thereof.

Figure 4:
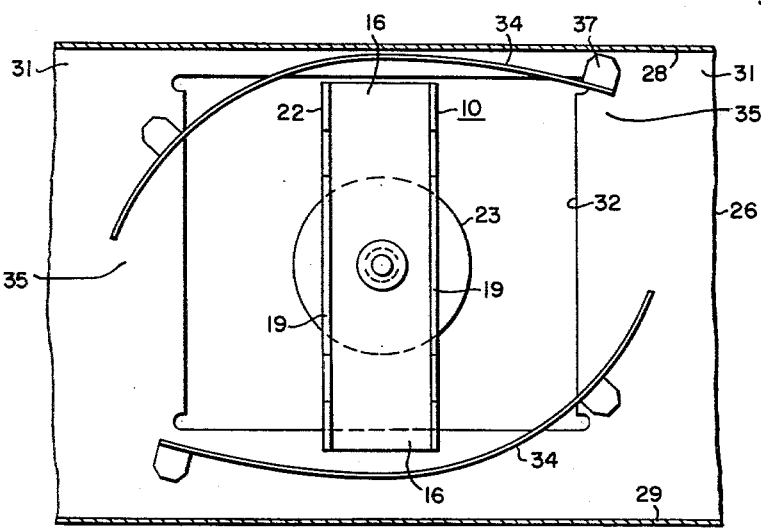
FIG. 4 is a sectional view, on a larger scale, taken on line IV—IV of FIG. 2 and looking upwardly but including a shroud structure.

The blower blade structure 10 may be disposed in a suitable body or housing structure including a first pair of spaced walls 26 and 27 disposed in parallel relation with each other and a second pair of spaced walls 28 and 29 disposed in spaced parallel relation with each other. The second pair of walls 28 and 29 are disposed normal to the first pair of walls 26 and 27, and connected thereto, thereby defining an elongated chamber 30 having a pair of opposed discharge outlets 31. The body wall 26 may be provided with a suitable air intake opening 32, which opening may be of any suitable shape, for example, square, as illustrated in FIG. 4.

The motor 23 may be mounted, in any suitable manner (not shown), in a central position with relation to the air intake 32 and the blower blade 10 may be disposed within the body in a substantially central position with relation to the air intake opening 32. As illustrated, the air intake opening 32 is so proportioned with relation to the blower blade 10 that it is slightly smaller in extent than the diametral length of the blower blade. However, the relative proportions of the blower blade and air intake 32 are not critical and may be varied without substantially affecting the efficiency of the blower blade.

The axial dimension of the blower blade 10 is somewhat of lesser extent than the spacing between the body walls 26 and 27 so that, in operation, the blower blade 10 is freely rotatable therein by the motor 23. Accordingly, there is provided adequate spacing A between the blower blade 10 and the body wall 27 and a spacing B between the blower blade 10 and the body wall 26. This spacing A and B is not critical and may be varied without affecting the efficiency of the blower to any great extent.

Figure 2:
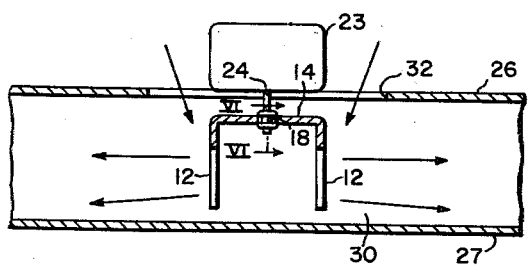
FIG. 2 is a central sectional view of a housing having the blower blade embodying the invention disposed therein.
Figure 3:
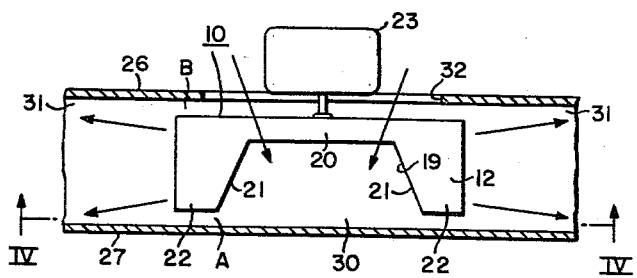
FIG. 3 is a sectional view similar to that shown in FIG. 2 but with the blower blade disposed in another position.
Figure 5:
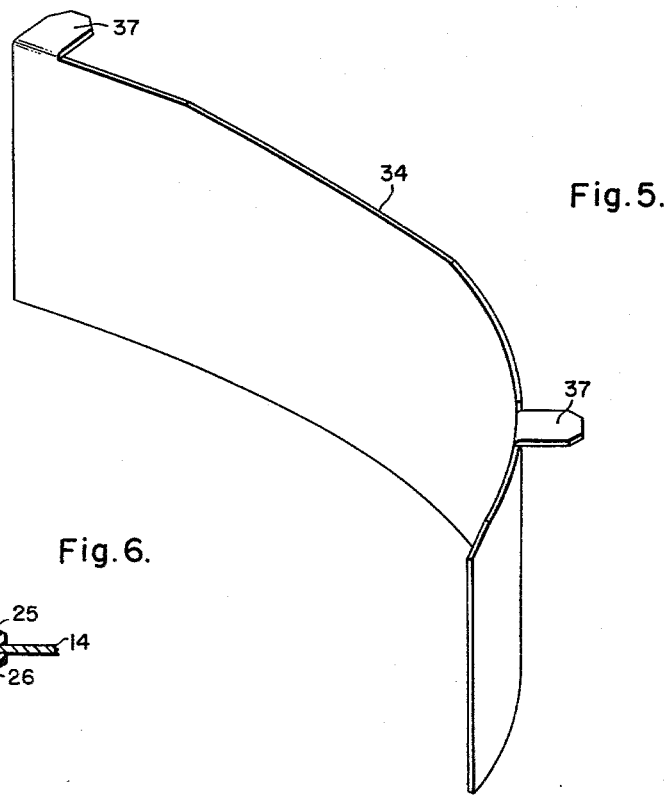
FIG. 5 is an isometric view of one of the shroud structures shown in FIG. 4.

In operation, as the motor 23 is energized, it rotates the blower blade 10 at a substantially high speed, thereby drawing air, as illustrated by the arrows in FIGS. 2 and 3, through the air intake opening 32, through the air inlets 19 and into the radial flow passages 16 of the blower blade. The thus induced air is thence directed radially outwardly through the radial passages 16 in two streams and directed to the discharge outlets 31 of the body structure. The pumping action of the blower blade is attained by the centrifugal force acting on the air in the radial passages 16 and the air is thus pressurized and pumped at a relatively high velocity.

The central wall portion 14 of the blower is substantially imperforate, thereby preventing recirculation of the air induced through the air intake 32.

The shape of the air inlets 19 has been illustrated as trapezoidal. This shape is desirable, since it imparts a complementary trapezoidal shape to the blades 22 that imparts rigidity thereto. However, this shape is not critical and may be modified to assume a generally rectangular shape.

If desired, there may further be provided a pair of shroud members 34 of arcuate shape disposed in substantially opposed relation to each other to form outlets 35 for directing the air pumped by the blower blade towards the discharge outlets 31 of the body with reduced turbulence and hence reduced noise characteristics. Here again, the specific shape of the shrouds 34 and the spacing of the shrouds with respect to the blower blade may be modified as desired. The shroud 34 may be attached to the wall portion 26 of the body in any suitable manner, for example, by a plurality of tabs 37.

The blower blade may be formed in any suitable manner desired and by any suitable method. However, it is especially suited for forming of a single piece of sheet metal, stamped or cut to provide the apertures 18 and 19 and then bent to form the sidewalls 12 and the central wall 14, by ordinary manufacturing tools. Accordingly, there is provided a blower blade that can be manufactured at a relatively low cost and that is highly competitive with others even though low production quantities are entailed.

The velocity imparted to the air and the pressurization effect are sufficient for many small household appliances, where the efficiency need not be the maximum obtainable with a blower but merely sufficient to provide effective operation.

Due to the simplicity of the blower blade and its substantially symmetrical shape and configuration, it is inherently balanced and substantially noiseless during operation, with the exception of some air noises created by the usual air effects. These effects may be minimized by the shrouds 34, as mentioned above.

While the invention has been shown in one form, it will be obvious to those skilled in the art that it is not so limited, but is susceptible to various changes and modifications without departing from the spirit thereof.

I claim as my invention:

1. A rotary blower blade structure formed of a single piece of sheet material and comprising
   an elongated channel structure of substantially U-shaped cross-section,
   said channel structure having a pair of mutually spaced planar side wall portions and a central planar wall portion integral with said side wall portions,
   each of said side walls having an air inlet aperture in its median portion, and
   means associated with the said central wall portion for supporting said channel structure for rotation about a central axis normal to said central wall,
   said wall portions providing a pair of diametrically opposed and radially extending passages of substantially uniform rectangular cross-sectional area terminating in a pair of outlet openings.

2. A rotary blower comprising a generally rectangular flat member having a pair of similar side flanges extending from two opposed edges of said member in the same direction and in parallel, coextensive, spaced apart relation, and means for supporting said member for rotation about an axis normal to said flat member at its center, said side flanges each having an air inlet opening in their median portions, and said flat member being substantially imperforate.

3. Air translating apparatus comprising wall structure defining a duct of rectangular cross section, a motor disposed exteriorly of said duct adjacent an intermediate portion thereof, said motor having an output shaft extending through one wall of said adjacent intermediate duct portion perpendicular to the plane of said one wall, a rotary blower positioned in said duct and secured on said motor output shaft for rotation thereby, said blower comprising a flat member mounted on said shaft in parallel slightly spaced relation to said one wall of the duct, said member having a pair of similar side flanges extending from two opposed edges of said member in the direction away from said one wall of the duct and in parallel spaced apart relation, said side flanges each having an air inlet in their median portions and said flat member being substantially imperforate, said one wall of the duct having at least one opening therethrough adjacent the motor shaft, whereby air is drawn into said duct through said one opening and around said flat member to the air inlet openings of the blower side flanges and then is forced outwardly through spaces defined by the terminal portions of said side flanges for flow through said duct.

References Cited by the Examiner

UNITED STATES PATENTS

| 479,642 | 7/92 | Hamilton | 230—134.45 |
| 567,018 | 9/96 | Baugh | 259—96 |
| 1,020,814 | 3/12 | Fay | 259—96 |
| 1,671,373 | 5/28 | Martin | 230—134.48 |
| 1,961,237 | 6/34 | Mobley | 230—134.45 |
| 2,330,938 | 10/43 | Williams | 230—47 |
| 2,540,136 | 2/51 | Oliphant | 230—134.48 |
| 2,568,536 | 9/51 | Beech | 230—125 |

FOREIGN PATENTS

| 1,116,535 | 2/56 | France. |
| 194,587 | 3/23 | Great Britain. |

JOSEPH H. BRANSON, Jr., *Primary Examiner.*